(12) United States Patent
Handa et al.

(10) Patent No.: US 12,478,307 B2
(45) Date of Patent: Nov. 25, 2025

(54) SYSTEMS AND METHODS FOR TREATING CARDIAC ARRHYTHMIA

(71) Applicant: IMPERIAL COLLEGE INNOVATIONS LIMITED, London (GB)

(72) Inventors: Balvinder Handa, London (GB); Xinyang Li, London (GB); Fu Siong Ng, London (GB); Nicholas Peters, London (GB)

(73) Assignee: IMPERIAL COLLEGE INNOVATIONS LIMITED, London (GB)

( * ) Notice: Subject to any disclaimer, the term of this patent is extended or adjusted under 35 U.S.C. 154(b) by 752 days.

(21) Appl. No.: 17/437,469

(22) PCT Filed: Mar. 11, 2020

(86) PCT No.: PCT/GB2020/050585
§ 371 (c)(1),
(2) Date: Sep. 9, 2021

(87) PCT Pub. No.: WO2020/183157
PCT Pub. Date: Sep. 17, 2020

(65) Prior Publication Data
US 2022/0183609 A1    Jun. 16, 2022

(30) Foreign Application Priority Data

Mar. 11, 2019 (GB) ..................... 1903259

(51) Int. Cl.
*A61B 5/367* (2021.01)
*A61B 5/361* (2021.01)

(52) U.S. Cl.
CPC ............. *A61B 5/367* (2021.01); *A61B 5/361* (2021.01)

(58) Field of Classification Search
CPC ................ A61B 5/367; A61B 5/361
(Continued)

(56) References Cited

U.S. PATENT DOCUMENTS

| | | | |
|---|---|---|---|
| 2014/0276152 A1* | 9/2014 | Narayan | A61B 5/316 600/508 |
| 2016/0106376 A1* | 4/2016 | Li | A61B 5/6852 600/373 |

FOREIGN PATENT DOCUMENTS

WO    2018/197865    11/2018

OTHER PUBLICATIONS

IEE Transactions on Biomedical Engineering, vol. 64, Apr. 18, 2017, Alcaine et al., "A Multi-Variate Predictability Framework to Assess Invasive Cardiac Activity and Interactions During Atrial Fibrillation", p. 1157-1168.

(Continued)

*Primary Examiner* — Nicole F Johnson
(74) *Attorney, Agent, or Firm* — Wegman Hessler Valore

(57) ABSTRACT

Apparatus for monitoring activation in a heart comprises a probe (100), a plurality of electrodes (102) supported at respective electrode positions on the probe and each arranged to contact a respective detection position on the heart. Each of the electrodes (102) is arranged to detect electrical potential at the respective detection position during movement of a series of activation wavefronts across the heart and to produce a respective electrode signal. Processing means is arranged to analyse the electrode signals to: identify pairs of the electrode signals between which there is a degree of Granger causality; define a causality vector between the electrode positions of each of the pairs of electrodes; identify a potential driver location; and analyse the direction of a plurality of the causality vectors around the (Continued)

potential driver position to generate an indicator of the presence of a driver at the potential driver location.

5 Claims, 15 Drawing Sheets

(58) Field of Classification Search
USPC .......................................................... 600/512
See application file for complete search history.

(56) References Cited

OTHER PUBLICATIONS

Annals of Biomedical Engineering, vol. 44, Feb. 5, 2016, Rodrigo et al., "Identification of Dominant Excitation Patterns and Sources of Atrial Fibrillation by Causality Analysis", p. 2364-2376.

IEEE Journal of Biomedical and Health Informatics, vol. 23, Jan. 1, 2019, Luengo et al., "Hierarchial Alogrithms for Causality Retrieval in Atrial Fibrillation Intracavitary Electrograms", p. 143-155.

Chaos, vol. 28, Jan. 26, 2018, Biton et al., "Causality analysis ofleading singular value decomposition modes identifies rotor as the dominant driving normal mode in fibrillation", p. 13128.

Search Report for Application No. GB1903259.8 dated Sep. 2, 2019, 8 pages long.

Alcaine Alejandro et al: "A Multi-Variate Predictability Framework to Assess Invasive Cardiac Activity and Interactions During Atrial Fibrillation", IEEE Transactions on Biomedical Engineering, IEEE Service Center, Piscataway, NJ, USA, vol. 64, No. 5, May 1, 2017 (May 1, 2017), pp. 1157-1168.

Handa Balvinder S et al: "Analytical approaches for myocardial fibrillation signals", Computers in Biology and Medicine, New York, NY, US, vol. 102, Jul. 17, 2018 (Jul. 17, 2018), pp. 315-326.

International Search Report and Written Opinion for International Application No. PCT/GB2020050585 dated May 13, 2020, 16 pages.

* cited by examiner

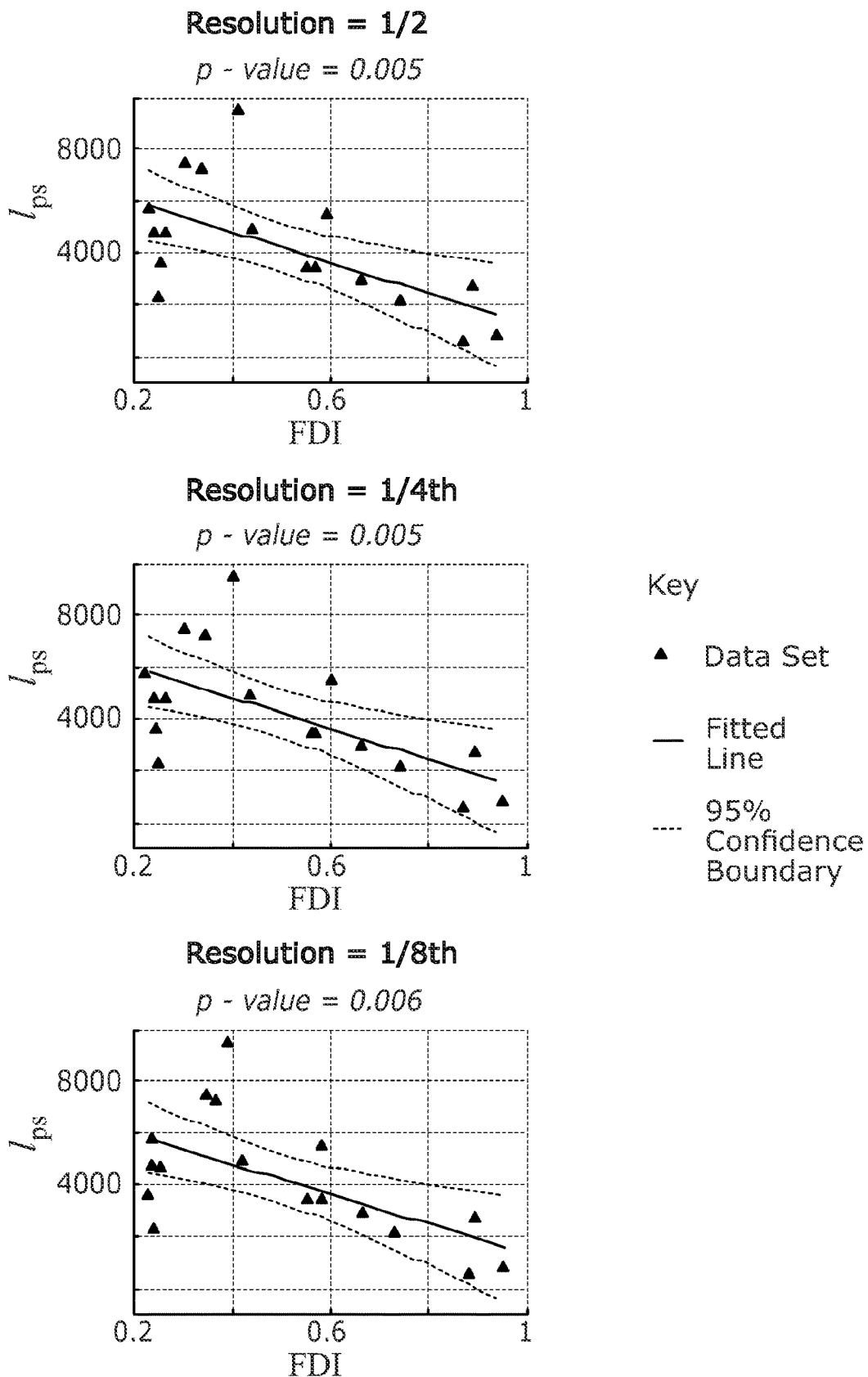
Fig. 4A Frequency Dominance Index (FDI)

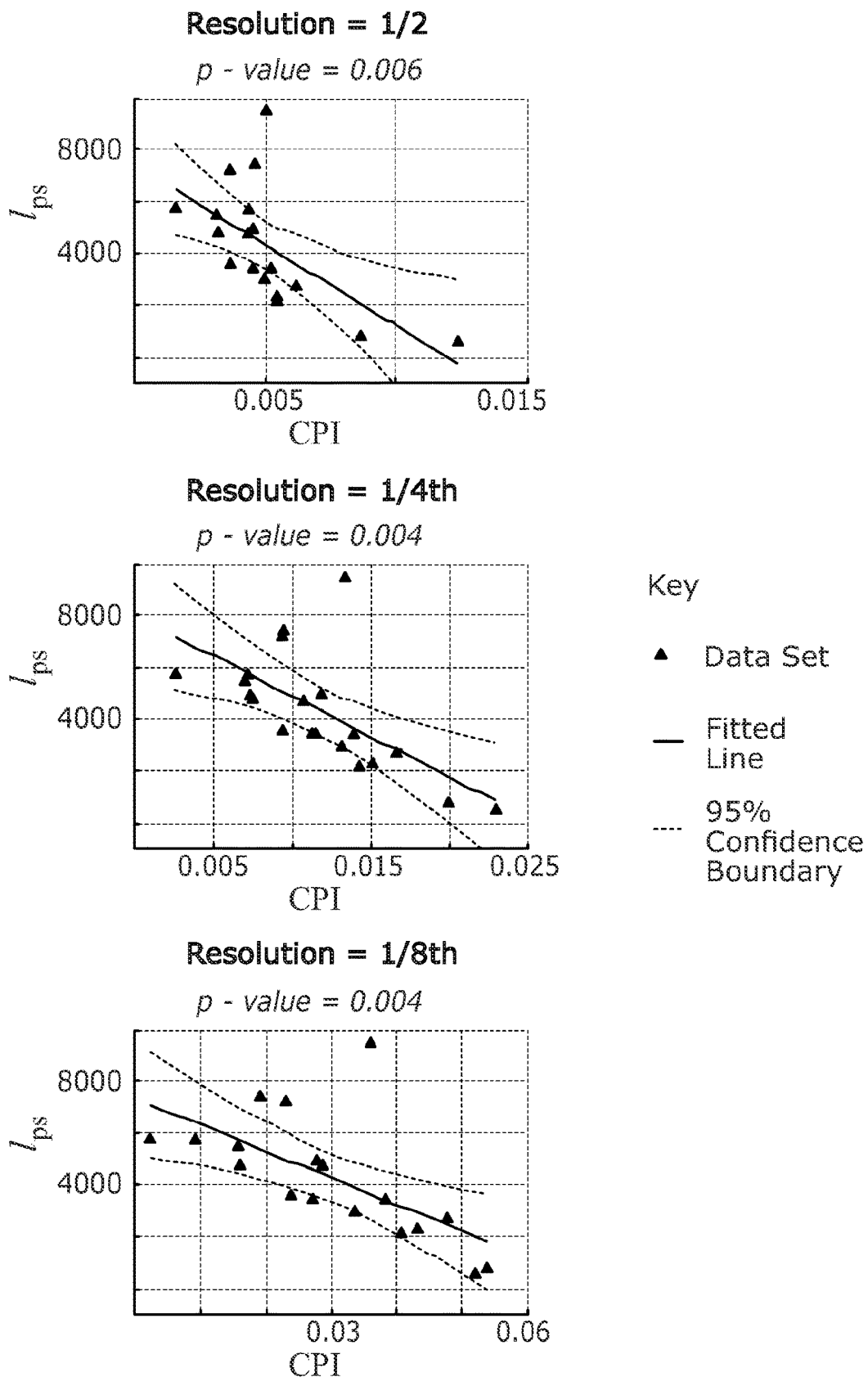
Fig. 4B Causality Pairing Index (CPI)

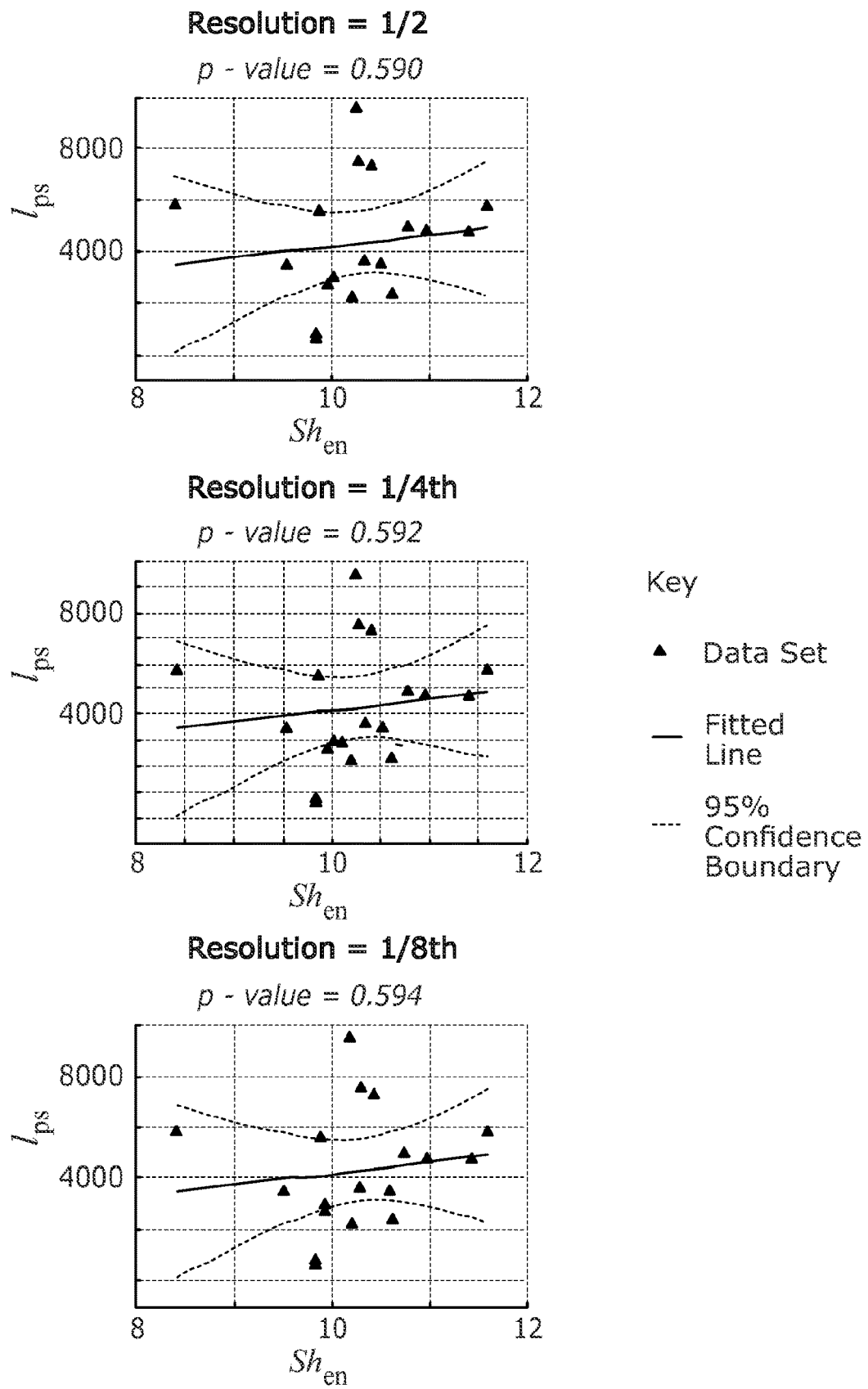
Fig. 4C Shannon Entropy ($Sh_{en}$)

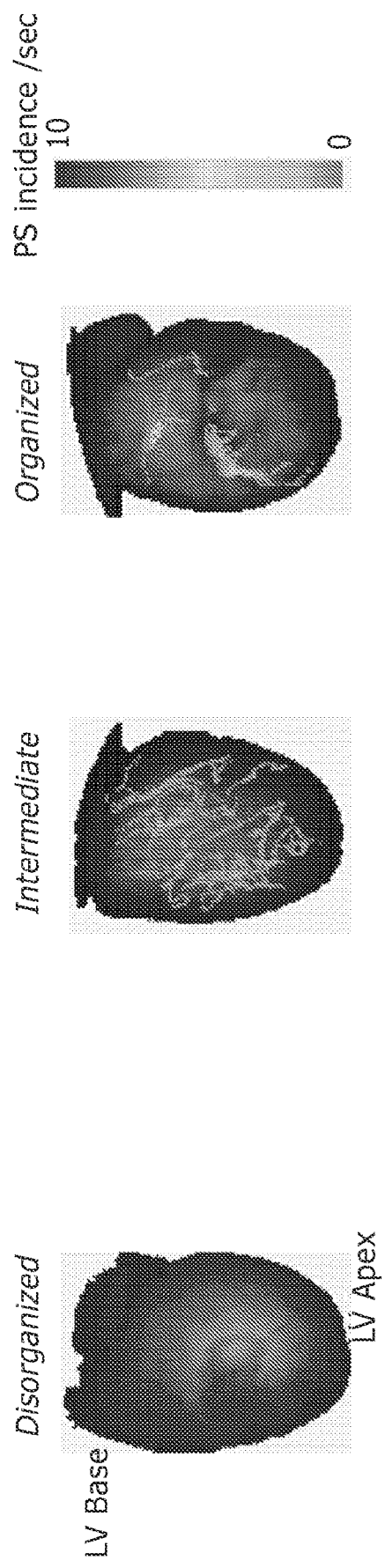
Fig. 5A Phase Singularity Heat Map
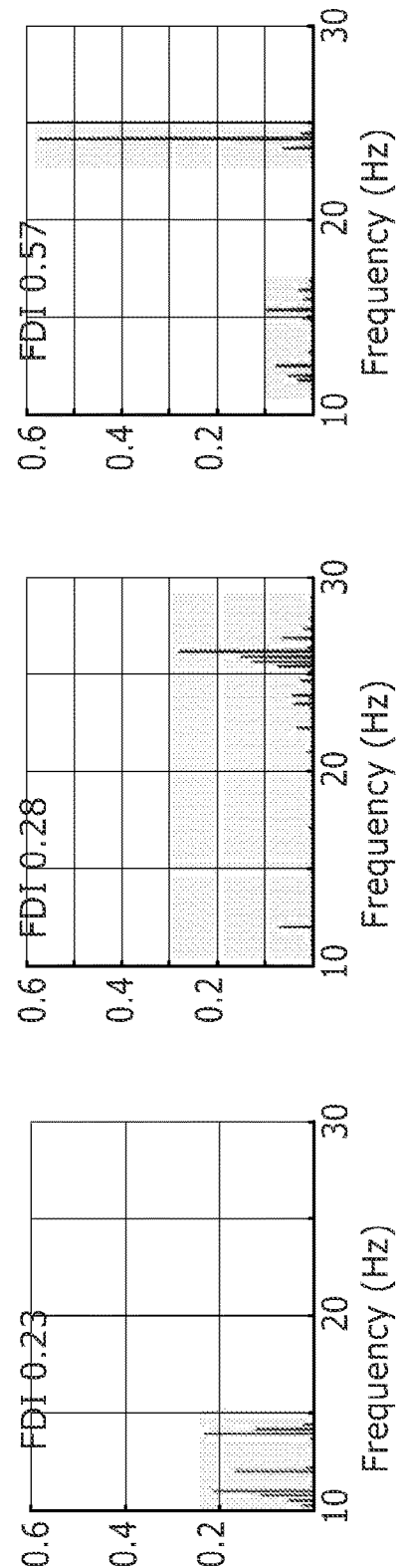
Fig. 5B Dominant Frequency Histogram

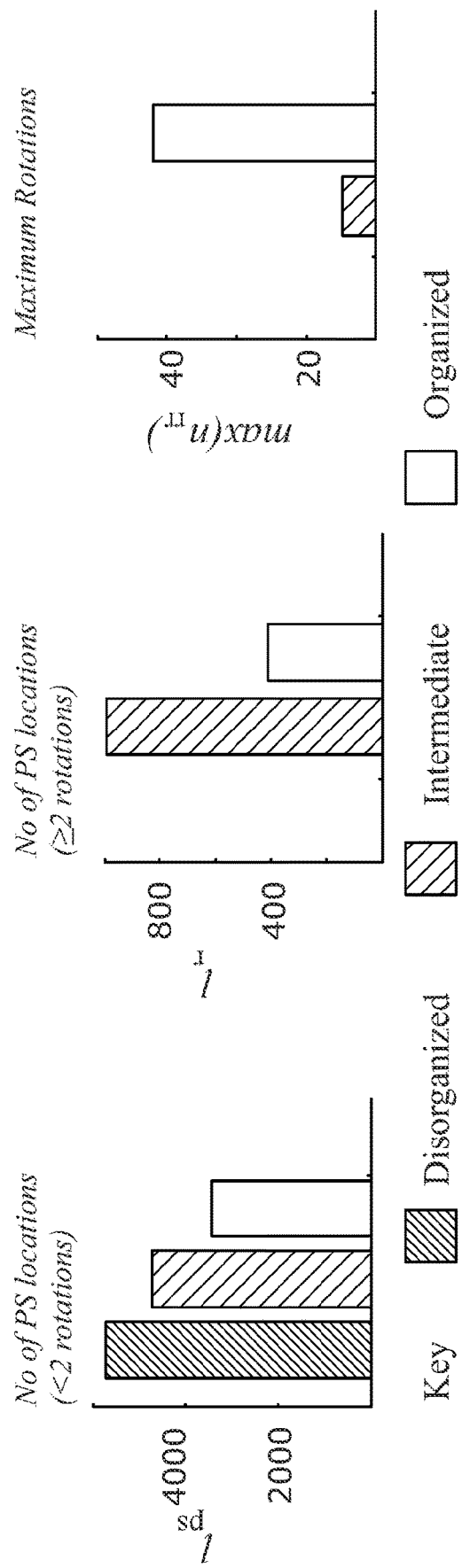
Fig. 5C Phase Singularity (PS) Characteristics

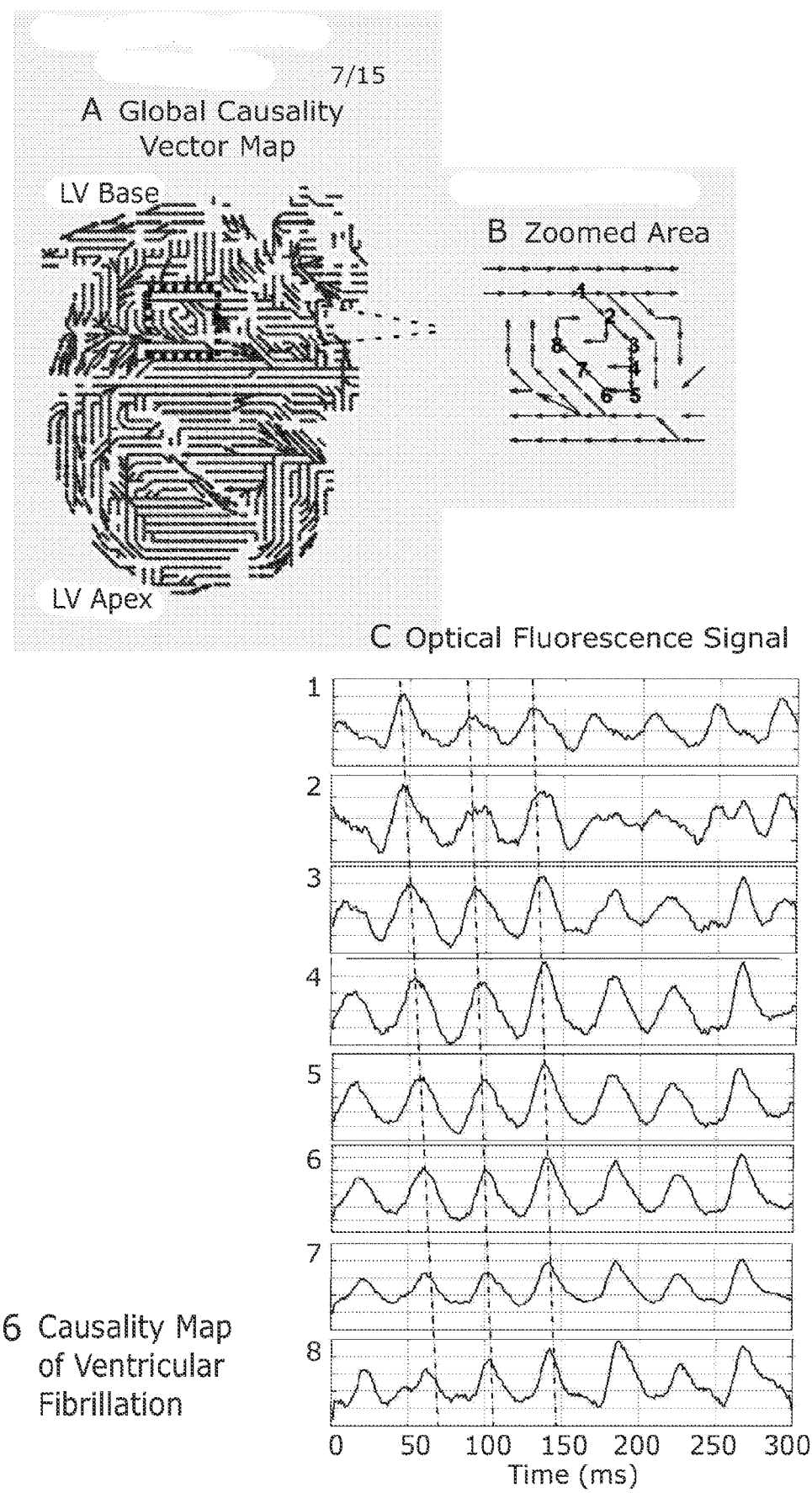
Fig. 6 Causality Map of Ventricular Fibrillation

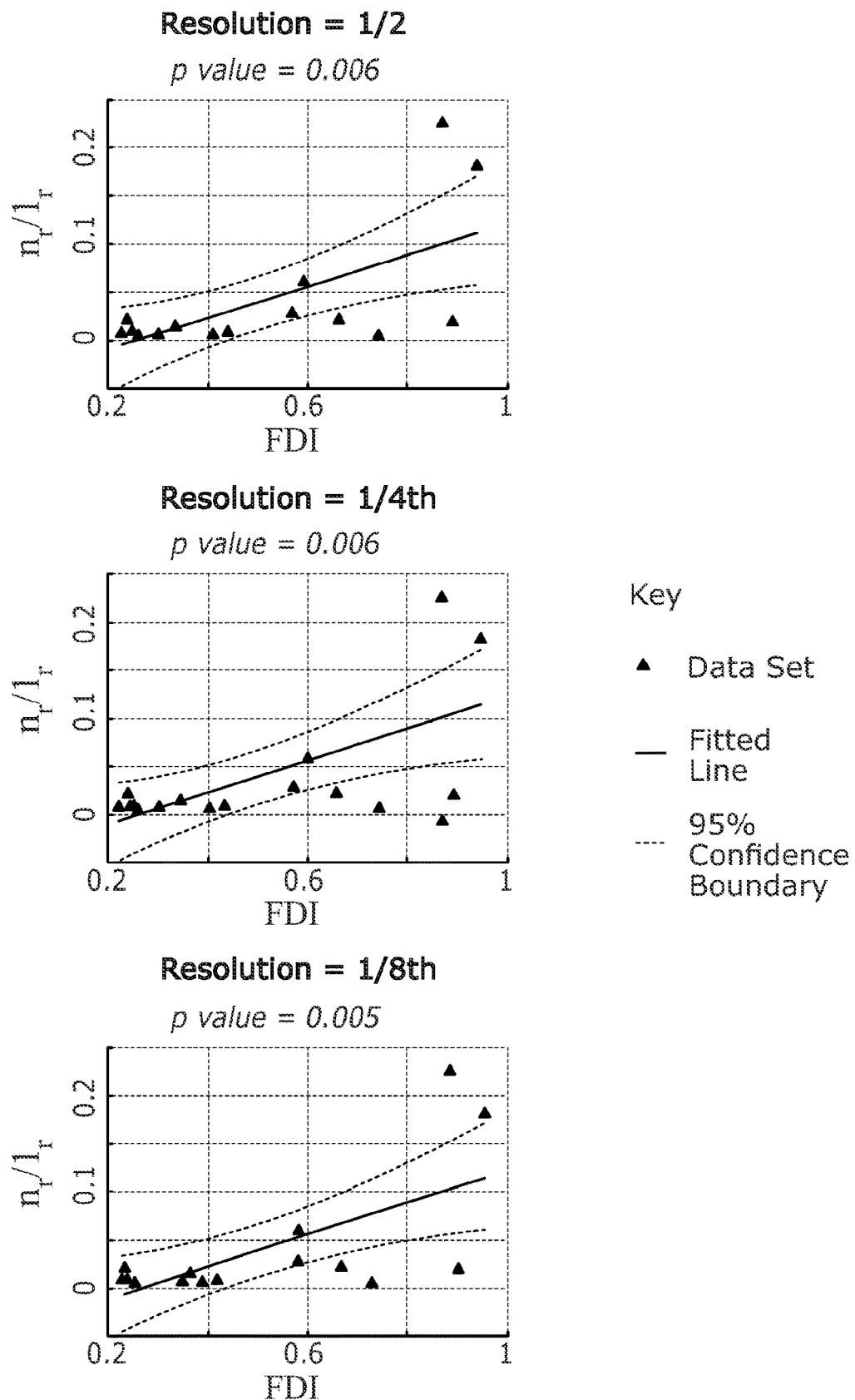
Fig. 9A Frequency Dominance Index (FDI)

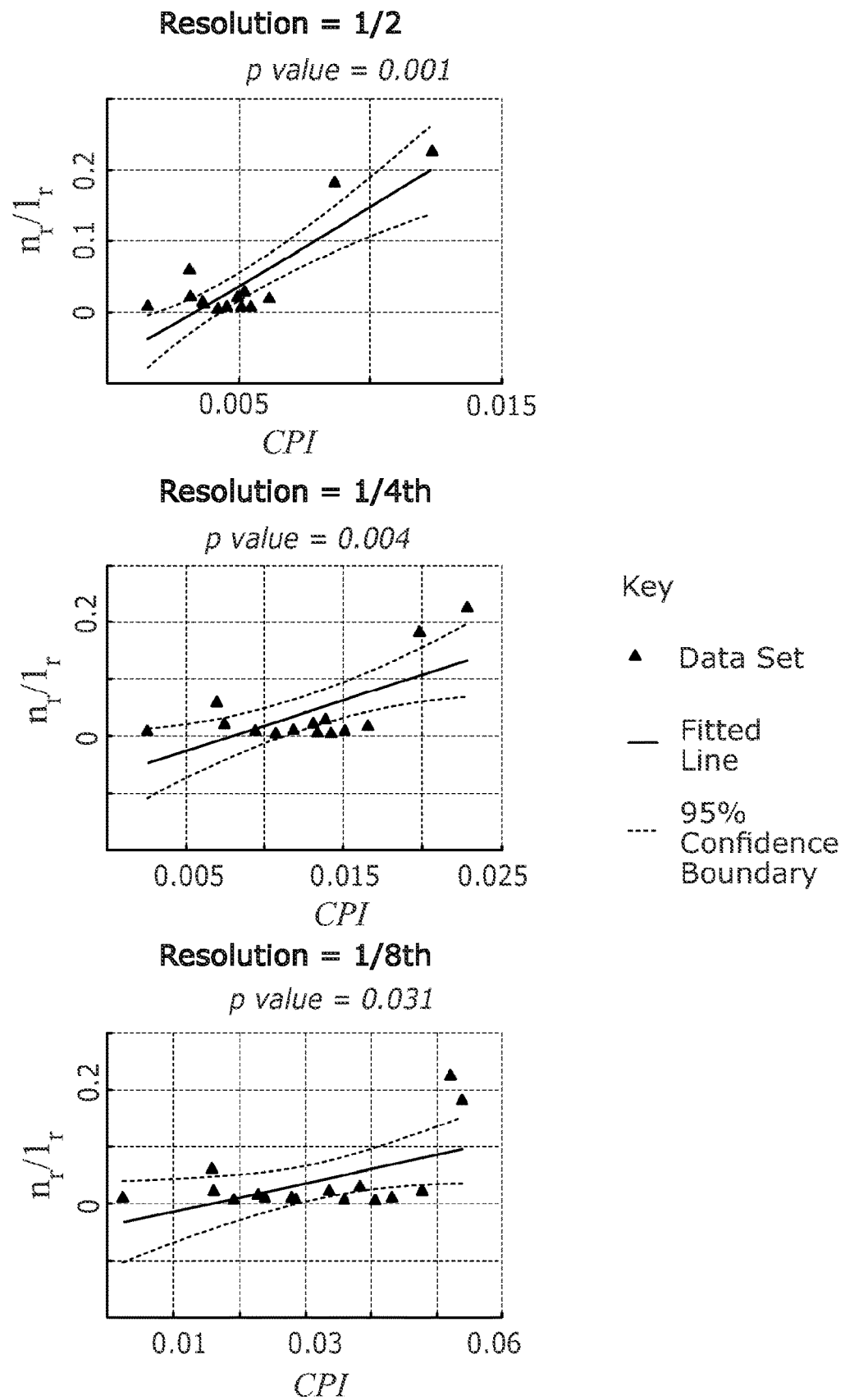
Fig. 9B Causality Pairing Index (CPI)

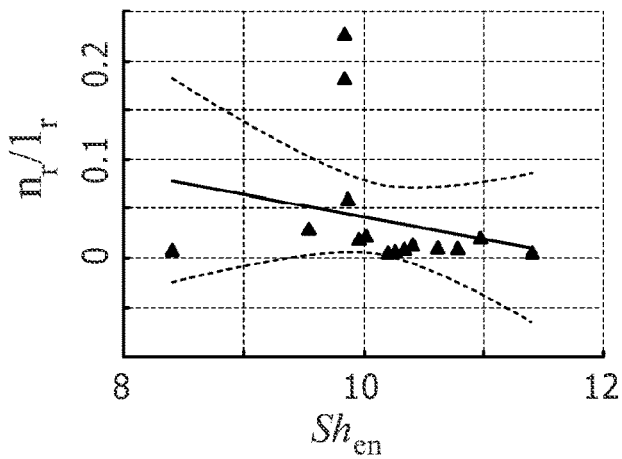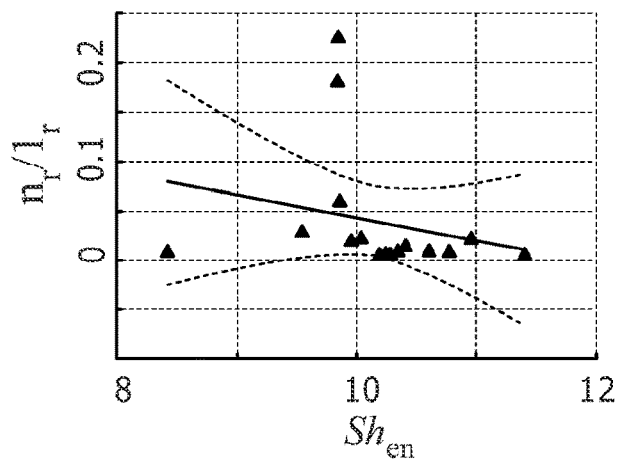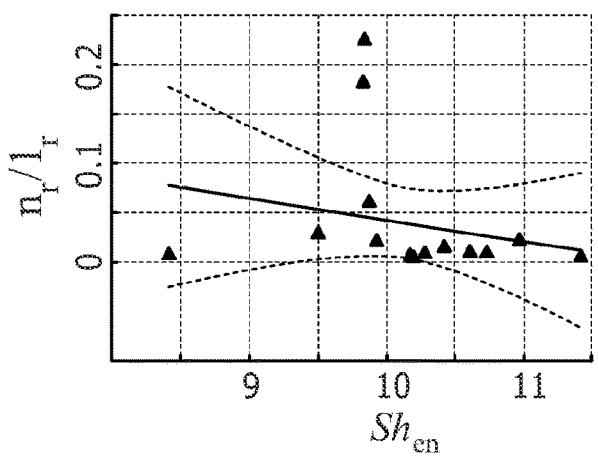
Fig. 9C Shannon Entropy ($Sh_{en}$)

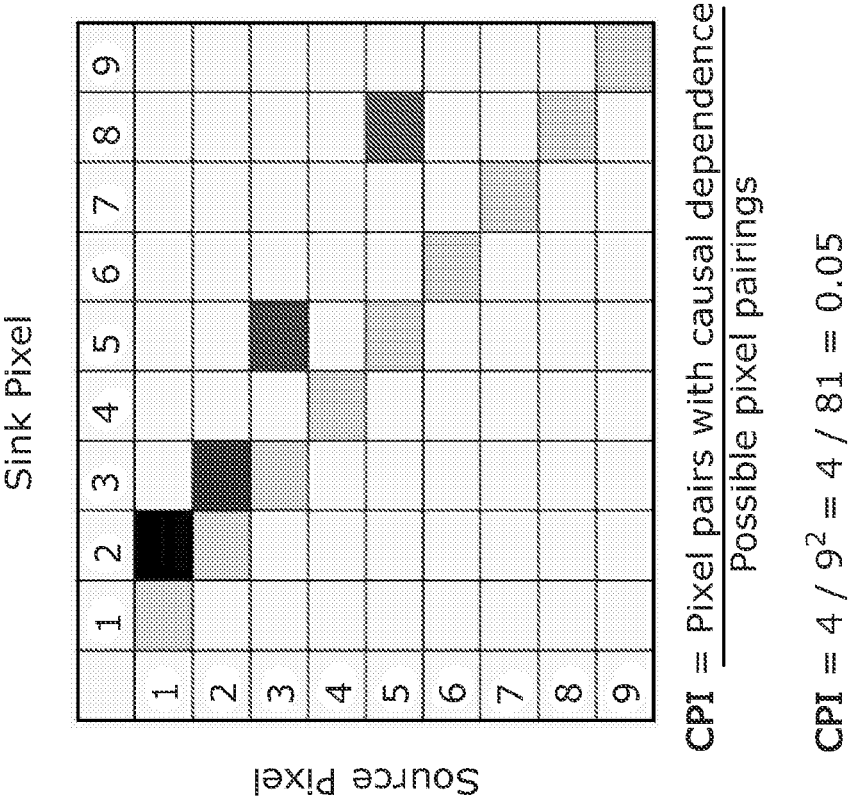
Fig. 10B Causality Pairing Index
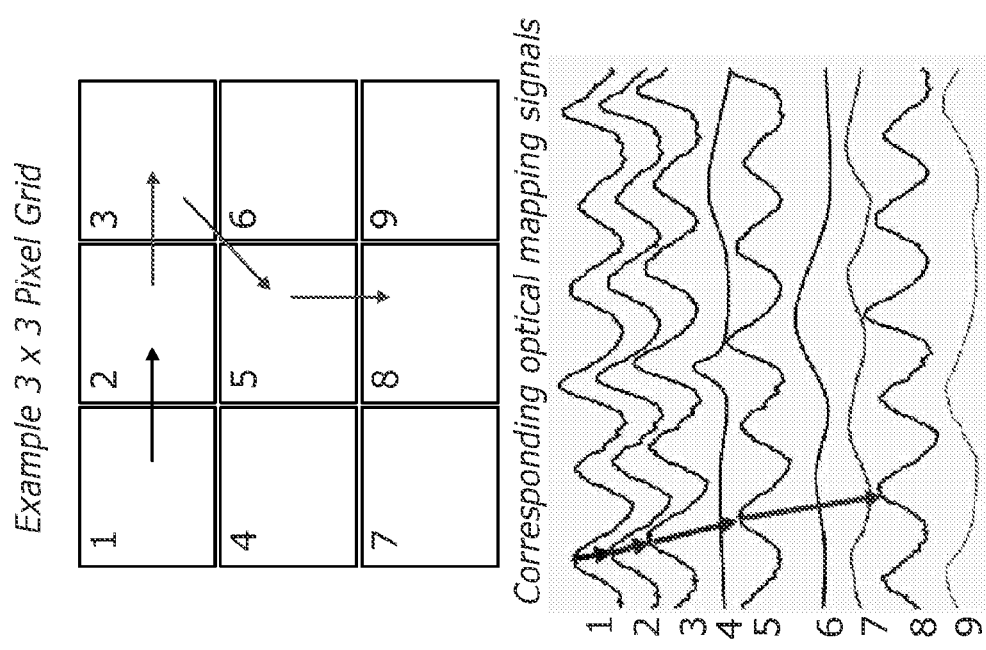
Fig. 10A Granger Causality Vector Map Example 1 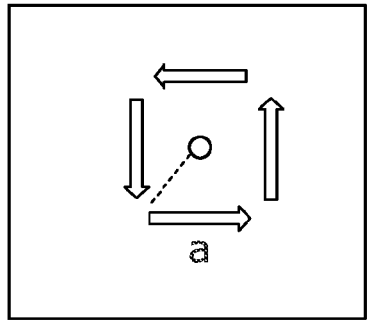  Example 2 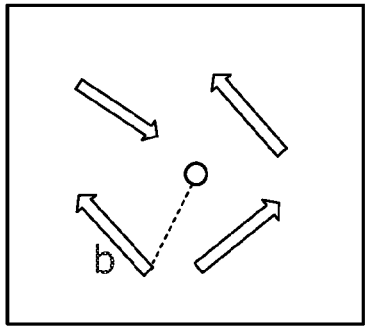  Example 3 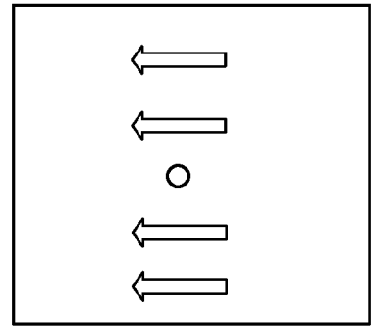
CIV = 1    CIV = 0.25    CIV = 0
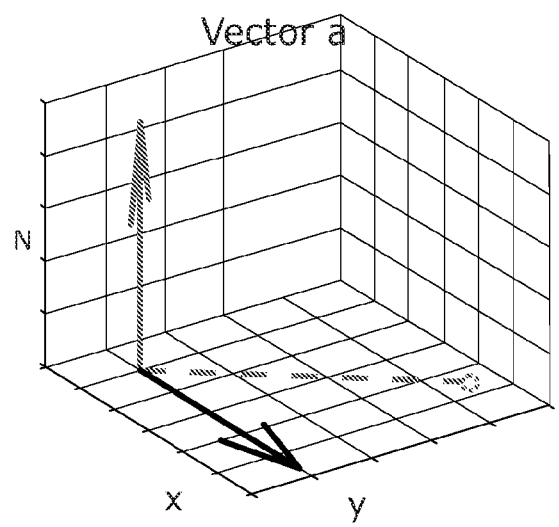
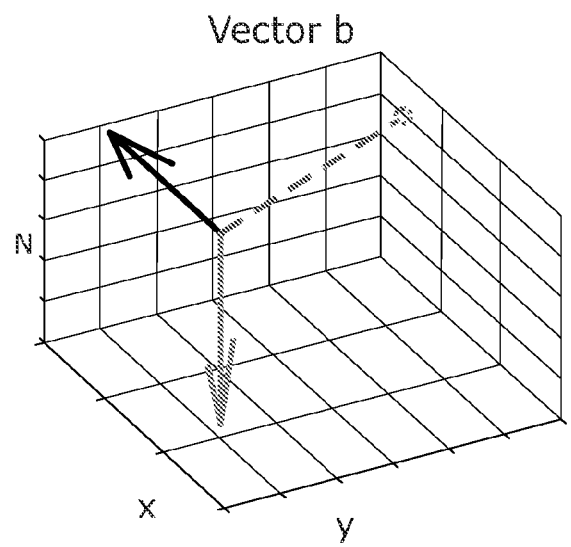
⟹ = cross product 3D vector
$$CIV = \frac{\text{No. of vectors pointing} \uparrow (up) - \text{No. of vectors pointing} \downarrow (down)}{\text{Total no. of vectors}}$$
Fig. 10C Circulatory Interdependence Value

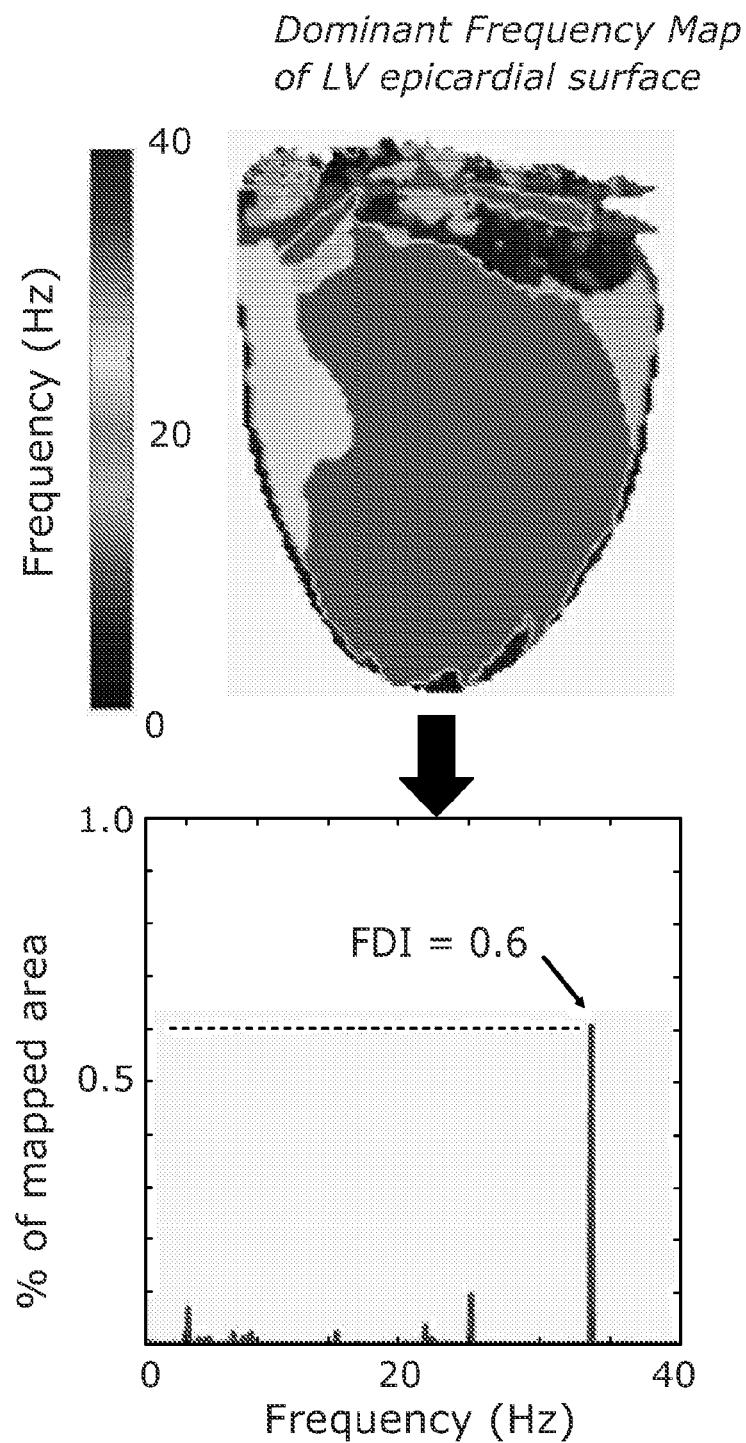
Fig. 10D Frequency Dominance Index

SYSTEMS AND METHODS FOR TREATING CARDIAC ARRHYTHMIA

CROSS REFERENCE TO RELATED APPLICATIONS

This application is a national phase of International Patent Application No. PCT/GB2020/050585 filed Mar. 11, 2020, which claims the priority filing benefit of Great Britain Patent Application No. 1903259.8 filed Mar. 11, 2019, which are incorporated herein by reference in their entireties.

FIELD OF THE INVENTION

The present invention relates to the analysis of cardiac activation, and in particular of the progression of activation through the heart. In particular it relates to the location of rotational patterns of activation which can be indicative of the presence of drivers of fibrillation. It has application in locating sites suitable for ablation therapy, for example to cure atrial fibrillation.

BACKGROUND TO THE INVENTION (FROM IDF)

Atrial Fibrillation (AF) and Ventricular Fibrillation (VF) are chaotic heart rhythm disorders where the underlying mechanisms are poorly understood. AF affects the upper chamber of the heart and can cause debilitating symptoms of palpitations and shortness of breath, and VF affects the lower main pumping chamber and can be lethal within seconds unless terminated, and is in fact a major cause of sudden cardiac death. There are limitations to drug based therapy for both VF and AF. Antiarrhythmic drugs can reduce the frequency of occurrence of these arrhythmias, and in the case of AF control symptoms by reducing the heart rate, but they cannot provide a cure. The current clinical approach aimed at providing a potential cure from VF and AF involves isolating areas driving the chaotic heart rhythm disorder that demonstrate some level of organisation and introducing a control burn (ablation) to make the 'driver' areas electrically inactive. The current methods of isolating these regions involve 'mapping' the electrical activity with clinical electrophysiology catheters introduced into the heart via the femoral veins in the groin under x-ray (fluoroscopy) guidance. The catheters have a limited number of contact points once in the heart to record electrical activity and can only sequentially record electrical activity from the whole heart chamber of interest in segments. The data of the electrical activity is then analysed to identify areas that are critical to sustaining the heart rhythm disorder. There are a number of techniques that are being utilised in research studies, including phase analysis, to identify driver regions that have yielded limited success in identifying these driver regions accurately or shown improved outcomes in cure rates longer term. One of the main limiting factors is the lack of resolution of the clinical catheters, which is presently limited to between 20 to 64 contact points in conventional mapping catheters spread over a large area. Another limitation is that the electrical data acquired needs to be sequentially stitched together from different regions of the heart for electrical activity that is continuously changing.

There is a need for analytical tools that can isolate critical driver regions for ablation to terminate these heart rhythm disorders. The analytical tool(s) need to be designed in a way that can cope with the clinical limitation of low resolution and low coverage data that requires stitching together from different regions to build a global picture of how the electrical activity in the whole heart chamber is driven.

WO2014/174274 discloses a system for locating and representing activation wave fronts and fibrillation drivers (also referred to as rotors and rotational drivers).

Alcaine A, Mase M, Cristoforetti A, Ravelli F, Nollo G, Laguna P, Martinez J P and Faes L A Multi-Variate Predictability Framework to Assess Invasive Cardiac Activity and Interactions During Atrial Fibrillation, IEEE Transactions on Biomedical Engineering Vol 64 No 5 May 2017 describes a model for calculating connectivity of neighbouring electrodes in atrial fibrillation, the so-called neighbour connectivity ratio $(N_Y)$ (1). $N_Y$ is calculated from data acquired by a multipolar catheter. In this model, three neighbouring electrodes (X,Y,Z) are considered. Thus for a given signal, Y, the degree of granger-causality influences from X and Z is calculated as an average of granger causality values and the $N_Y$ is calculated using the formula—GY|XZ divided by $P_Y$, where $P_Y$ is the self-predictability value. Thus, by this metric high $N_Y$ values represent electrodes where the signal is influenced by the neighbour rather than a self-autonomous process (the denominator). The $N_Y$ average value is thereafter quoted as a measure of connectivity in fibrillation. In this method, only three neighbouring electrodes are considered for each GC measurement calculation. The methodologies proposed by Alcaine et al. assume an ideal shape of the electrodes in the catheter with no distortion, whereby electrodes are evenly distributed, and catheters used for mapping different locations are the same. However, this is removed from the reality of clinical mapping, where the catheters are pliable and distort to come into contact with the mapped myocardium.

SUMMARY OF THE INVENTION

The present invention provides apparatus for monitoring activation in a heart, the apparatus comprising a probe, a plurality of electrodes supported at respective electrode positions on the probe and each arranged to contact a respective detection position on the heart, wherein each of the electrodes is arranged to detect electrical potential at the respective detection position during movement of a series of activation wavefronts across the heart and to produce a respective electrode signal, and processing means arranged to analyse the electrode signals to identify pairs of the electrode signals between which there is a degree of Granger causality. The processing means may further be arranged to define a causality vector between the electrode positions of each of the pairs of electrodes. The processing means may further be arranged to identify a potential driver location. The processing means may further be arranged to analyse the direction of a plurality of the causality vectors around the potential driver position to generate an indicator of the presence of a driver at the potential driver location.

The processing means may further be arranged to identify the pairs of the electrodes using a multi-variate auto-regression model.

The processing means may be arranged to analyse the direction of a plurality of the causality vectors around the potential driver location by: defining a relative position vector for each of the pairs of electrodes, related to the relative position of at least one of the pair of electrodes and the potential driver position, and, for each pair of electrodes, forming a vector cross product between the causality vector and the relative position vector.

The processing means may further be arranged to sum the vector cross products to generate the indicator.

The processing means may further be arranged to analyse the causality vectors in a plurality of regions to determine an organization measure for each of the regions, and to select one of the plurality of regions based on the organization measure, and to define the potential driver locations within said one of the plurality of regions.

The organization measure may be a measure of the number of said pairs of electrodes within said one of the regions, or it may be a measure of at least one dominant frequency in the electrode signals.

The electrodes may extend over a detection area of the probe. The detection area may be arranged to contact a detection region of the heart.

The present invention provides methods using Granger causality analysis to identify areas in the heart critical to sustaining AF and VF. Granger causality is a mathematical analysis tool that looks at sampled data from neighbouring regions and determines whether there is interdependence of signals, i.e. whether electrical activity in one region influences electrical activity in another region in a regular manner or whether the activity in neighbouring regions is completely random. Granger causality analysis has been used to predict weather patterns in neighbouring regions and to forecast weather. The present invention applies this methodology in a sophisticated way to identify heart regions that sustain AF and VF.

Methods according to the present invention may firstly determine whether there is organisation within the seemingly chaotic heart rhythm in fibrillation. Thereafter they may isolate fibrillation data sets that show organisation from those that are completely chaotic. Some embodiments rely on the finding that only organised fibrillation has driver regions. They may then utilise Granger causality maps to identify these driver regions by sampling the electrical activity sequentially with limited coverage of the chamber of interest. Some embodiments are able to isolate driver regions using these maps. Finally some embodiments adopt a binary measure of rotational activity in a region of the heart, which may be referred to as, or derived from a circular interdependence value (CIV), that differentiates between driver and non-driver regions. Some embodiments are well adapted to work with low resolution, low coverage and sequentially stitched data.

The present invention may comprise the step of determining how organised the seemingly chaotic activity in the heart chamber of interest is. We have found that a critical level of 'organisation' is typically present in a heart chamber where the chaotic heart rhythm is driven by a critical driver area. The method may include the use of one, or both, of two analytical tools designed for measuring the global organisation of fibrillation, referred to as frequency dominance index (FDI) and causality pairing index (CPI) to measure organisation.

The method may comprise building one or more local Granger causality maps to identify areas with critical drivers.

The method may comprise determining the value of a rotation index that may be used in a binary way to distinguish whether the mapped area has an organised driver or no driver. This rotation index may be referred to as a circular interdependence value (CIV).

An advantage of some embodiments of the invention is that they work with low resolution data, can cope with dynamic changing data and are well adapted to combining or 'stitching' of information from different regions, for example to form a single map. Unlike other technologies, some embodiments can measure global organisation of AF and VF, and thereby distinguish hearts that have drivers from hearts that have completely disorganised activity with no drivers. These embodiments can therefore also potentially offer a tool for selecting patients who would benefit from treatment and reduce harm by filtering out those who would not benefit from treatment.

The system may further comprise any one or more features, in any combination, of the embodiments of the invention which will now be described by way of example only with reference to the accompanying drawings.

BRIEF DESCRIPTION OF THE DRAWINGS

FIG. 4 is a set of graphs showing how FDI and CPI can characterize the global organization of fibrillation at high to low spatial resolution;

FIG. 5 is a set of phase singularity heat maps and graphs showing characterization of a rotational driver in fibrillation of differing organization;

FIG. 6 shows an example GC map of an organized VF data set (A), and zoomed localization of a driver region showing a signature continuous circulatory interdependence of signals with one directional flow of activation (B), with correlating optical mapping signals from the driver region (C);

FIG. 9 includes graphs showing the degree of correlation between stable rotational drivers and FDI (A), CPI (B), and shannon entropy ($Sh_{en}$) (C), at decreasing resolutions of ½ (left), ¼th (middle) and ⅛th (right) of full resolution, whereby only every 2nd, 4th or 8th respective data point or pixel were analyzed in the X and Y plane from optical mapping of ventricular fibrillation data; and FIG. 10 shows schematically a method of locating rotational drivers in a heart.

DESCRIPTION OF THE PREFERRED EMBODIMENTS

Figure 1:
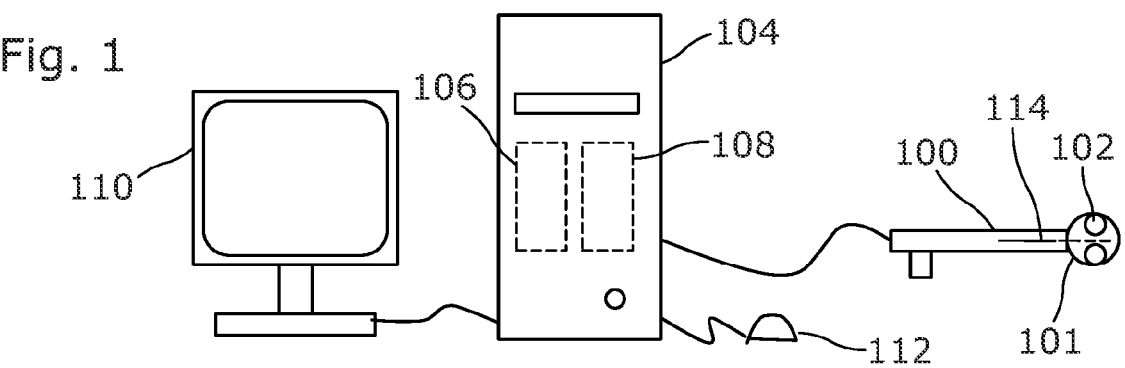
FIG. 1 is a diagram of a system according to an embodiment of the invention.

Referring to FIG. 1, a cardiac monitoring system according to an embodiment of the invention comprises a catheter 100 having a probe 101 at one end with a set of electrodes 102 located on it. Each of the electrodes 102 is connected independently through the probe catheter 100 to a computer 104 which is arranged to acquire, store and analyse the voltages detected by the electrodes 102. Specifically the computer 104 comprises a memory 106 and a processor 108. The processor is arranged to sample the voltages, detected by the electrodes 102 and transmitted to the processor 108 as electrode signals, at a regular sample rate and to store the values of the sampled voltages, which form a time series of sample values, in the memory 106, and then to analyse the stored voltage values so as to analyse the activation of the heart in the area contacted by the probe 101. Specifically the data can be analysed to identify fibrillation drivers within areas of regular activation. The processor 108 is arranged to generate from the sampled voltage data, a causality data set which may then be provided to the display screen 110 which can display an image showing the causality pattern as an activation pattern in the heart so that a user can interpret it. The processor is further arranged to analyse the causality data to identify driver locations and may indicate these on the display screen 110, for example on an image of part the whole of the heart. The probe 101 can be moved from region to region within the heart to focus attention in the regions where the targets are suspected.

The catheter 100 may further comprise an ablation tip 114 which is connected to a radio frequency (RF) power source. The ablation tip 114 can therefore be used for ablation of regions of the heart which are found to be drivers of atrial fibrillation. The catheter may for example be a Smart-Touch catheter (Biosense-Webster) or a Tacticath catheter (Abbott). Alternatively separate catheters may be used, one such as the AFocus catheter for diagnosis or location of the source of fibrillation, and the other for example a Navistar catheter for ablation.

The data acquisition, data processing, and image display will now be described in more detail. The processor 108 is arranged to perform each of these steps. For any particular position of the catheter 100, a stream of raw signal data is acquired from each of the numerous electrodes 102 of the catheter. The position of each electrode 102 is known through one of a variety of methods well known to those skilled in the art, such as those marketed as CARTO™ or NavX™. This means that the position of each electrode over time can be recorded as position data so that each sample of the signal from each electrode can be combined with associated position data indicating the position of the electrode at the time when the signal had the sampled value. The following steps are then carried out by the system under the control of the processor 108.

Firstly the electrical data is acquired. For this step the catheter 100 and computer 104 are arranged to acquire unipolar or bipolar electrogram data. A standard definition of unipolar electrogram data for a particular site is the potential difference between an intracardiac electrode at that site and a reference potential, for example at Wilson's central terminal, or any other combination of skin surface electrodes. Alternatively, a unipolar electrogram can be defined as the potential difference recorded between an intracardiac electrode and an electrode placed within the body at a site outside the heart, for example in the inferior vena cava, a large vein adjacent to the heart in which an electrode can very conveniently be located. Therefore for unipolar electrogram data a further electrode, not shown, is also provided and connected to the computer to provide the reference signal in known manner.

Alternatively bipolar electrogram data can be used, being defined as the potential difference between two of the intracardiac electrodes 102. In this case no further reference electrode is needed.

Whether unipolar or bipolar electrogram signals are used, the electrical signal (voltage) from each electrode (or electrode pair) is sampled at a regular sample frequency and the sampled values stored in memory as a multi-variate signal having a number of rows corresponding to the number of electrodes, with each row containing the sample values for the respective electrode signal.

Figure 2:
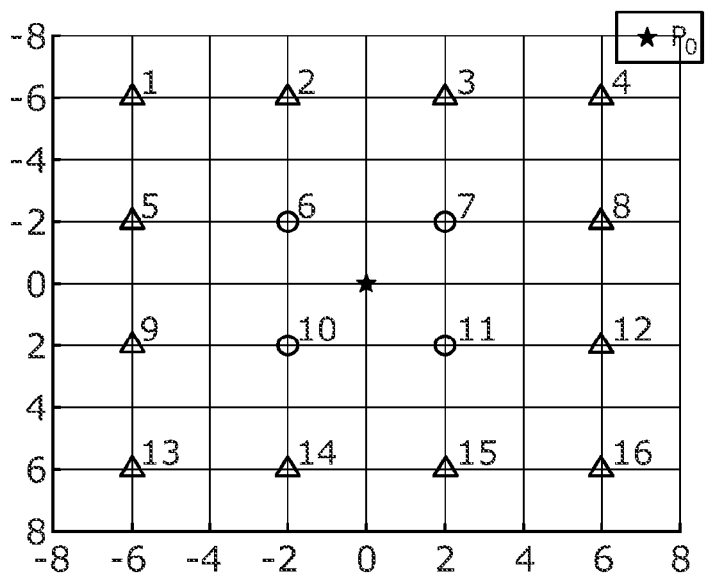
FIG. 2 is a diagram of the positions of electrodes on the probe of the system of FIG. 1.

In the embodiment shown, the probe has 16 electrodes 102 and so the multi-variate signal x(t) has $n_p$=16 rows. The locations of the electrodes 102, assuming no deformation of the catheter, are shown in FIG. 2. A multi-variate auto-regression (MVAR) model may be applied to all rows of x(t) at the same time, i.e.

$$A_\tau = \arg\min \sum_{t=p+1}^{n_t} \left\| x(t) - \sum_\tau^p A_\tau x(t-\tau) \right\|_2 + \lambda \sum_\tau^p \|A_\tau\|_1 \quad (1)$$

where $A_\tau$ is the 16-by-16 auto-regression coefficient matrix, $\tau$ is the time lag between signals, p the maximal time lag of the model and $\lambda$ the regularization coefficient. The Granger causality (GC) can be inferred from the matrix $A_\tau$, each element of which has a sign and a magnitude. The magnitude of the element of the i-th row and j-th column in $A_\tau$ reflects the strength of the j-th row of x(t) in predicting i-th row of x(t). In other words, if the element i-th row and j-th column in $A_\tau$ is larger than 0, i.e. has a positive sign, the Granger causality is from j-th row to the i-th row of x(t), indicating that the activation wave front propagation is from the j-th electrode to the i-th electrode, whereas if it is less than zero, having a negative sign, then the propagation direction is from i-th electrode to the j-th electrode.

Based on $A_\tau$, an organization measure, such as the causality pairing index CPI may be calculated. CPI may be defined as the normalized number of non-zero elements of $A_\tau$, i.e., $$CPI = \frac{|\{A_\tau(i,j), A_\tau(i,j) \neq 0\}|}{n_p^2} \text{ for } i, j = 1 \ldots n_p \, \tau = 1 \ldots p \quad (2)$$

CPI measures the percentage of the electrode signal pairings, i.e. pairings of detection positions on the heart, between which there is a propagational effect: the larger the number, the more stable propagational effects between the signals, the more organised the data.

The CPI may be determined over all of the electrodes of the probe, or a set of the electrodes the set containing less than all of the electrodes, for each position of the probe as the probe is moved around the heart. Alternatively, a larger causality map may be built up for a larger area using the map for each position of the probe and the location of the probe relative to the heart, which can be determined by various location systems, and the global organization measure determined for that larger area.

It will be appreciated that the calculation of CPI described above fundamentally differs from the methodology proposed for $N_Y$ by Alcaine et al. CPI considers the whole of (or a large proportion of) the recording surface and all (or a large proportion of) the recording points (electrodes) in its calculation to measure global organisation in fibrillation. For instance, for a multipolar catheter recording 20 bipolar signals, if all of them are used, CPI is calculated by plotting a 20 by 20 matrix in one regression model and proposes that there are 20×20 pairs minus 20 self-pairs=380 causal pairs. CPI is thus expressed as a ratio of the number of causal pairs (that have granger-causal influence over a defined threshold) over the number of all possible pairs to generate a metric that measures global organisation in fibrillation. Furthermore, sparsity constraints can be introduced in CPI to define what constitutes neighbouring pairs to filter influence of distant noise. This may be introduced in form of distance thresholds or thresholding to a certain number of neighbouring electrodes/recording points. CPI can be calculated from clinically acquired electrogram data by this methodology after calculating Granger causality relationships for all neighbouring electrode without further pre-processing steps.

In order to locate the drivers, for each signal i, and therefore each electrode position, a causality vector is determined, which indicates the 'direction' of causality and therefore the direction of wavefront propagation past the electrodes. This may be in the form of a major source vector $\overleftrightarrow{v}_{i,i_s}$ defined as the vector pointing to electrode position i from another electrode position where its major source signal $i_s$ is generated, where $i_s$ is the signal which has the highest GC contribution to signal i:

$$i_s = \arg\max_j A_\tau(i,j) \text{ for } i_s = 1 \ldots n_p \text{ and } A_\tau(i,i_s) \neq 0 \quad (3)$$

Figure 3:
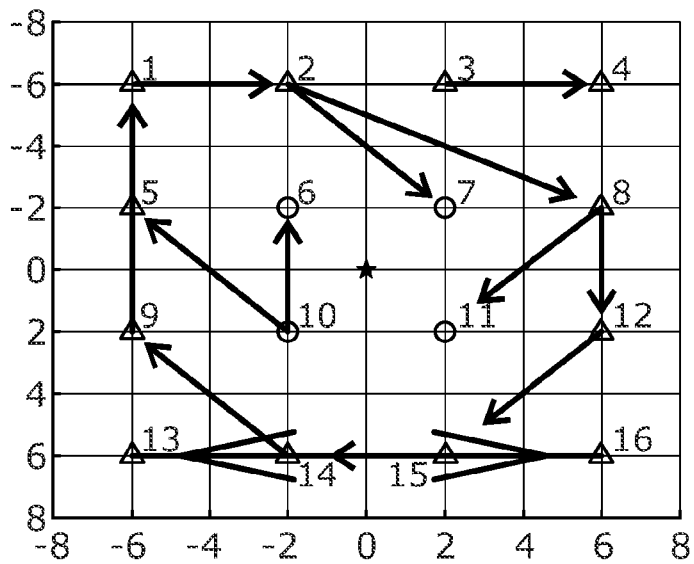
FIG. 3 is a causality map showing causality vectors defined around a potential driver position.

By plotting the major source vectors $\overleftrightarrow{v}_{i,i_s}$ for all electrode positions within a region, a GC map of that region may be derived, as shown in FIG. 3. Again this may be for just the area covered by the probe, but may be for a larger region of the heart, built up using different positions of the probe on the heart.

A rotation index may be defined which measures the degree of wavefront rotation about a point on the heart, typically one of the detection positions, which is a potential driver location. In general terms this may be determined by determining, for each potential driver location on the heart, a plurality of vector cross products. Each vector cross product may be the cross product of the causality vector pointing to one of a number of surrounding points, and a relative position vector which is a vector between the surrounding point and the potential driver position. Once the vector cross product has been determined for each of the surrounding points, those cross products may be summed or otherwise analysed to generate the rotational index. This rotation index may be referred to as a circular interdependence value (CIV) and may, for example, be defined as the percentage of the major source vectors $\overleftrightarrow{v}_{i,i_s}$ pointing in the same rotational direction about each electrode position, where the electrode positions are used as the potential driver positions:

$$CIV = \sum_{n_c=1,2} \frac{\sum_i \text{sign}(\overleftrightarrow{v}_{i,i_s} \times \overleftrightarrow{v}_{i,0})}{|\{i\}|} \text{ for } \|\overleftrightarrow{v}_{i,0}\| < \sqrt{2}\,dn_c \quad (4)$$

Referring to FIG. 3, to measure the degree of rotation about the central point (0,0) marked with a star, $\overleftrightarrow{v}_{i,0}$ is the vector pointing from the central point (0,0) to electrode position i. sign($\overleftrightarrow{v}_{i,i_s} \times \overleftrightarrow{v}_{i,0}$) measures the rotational direction of $\overleftrightarrow{v}_{i,i_s}$ referred to $\overleftrightarrow{v}_{i,0}$. CIV=1 indicates that all the major source vectors $\overleftrightarrow{v}_{i,i_s}$ surrounding the central point (0,0) are of the same rotational direction, and subsequently, the central point is highly likely to be the driving area.

It will be appreciated that, since the major source vectors each point to one electrode position from the electrode which shows the highest degree of Granger causality for that one electrode, each electrode position only has one major source vector pointing towards it, though any one electrode position may have one or two, or even more, major source vectors pointing away from it.

Application of CIV to mapping data from a multipolar mapping catheter may be further enhanced by adaptation of the analytical technique to the three-dimensional space. Calculation of CIV may therefore take into consideration the 3D locations at each mapping position for an accurate output. The positions of each of the electrodes on the catheter over time can be determined by the mapping system as mentioned above.

To calculate CIV, we consider two causal signals from neighbouring electrodes, $x_i(t)$ and the neighbouring source index signal with the strongest causal influence $x_{si}(t)$. $p_{si}$ and $p_i$ are defined as the 3D coordinates of the locations corresponding to $x_i(t)$ and $x_{si}(t)$, respectively. The causality direction for $x_i(t)$ is labelled $g_i$ and is calculated as $$g_i = p_{si} - p_i.$$

$p_0$ is the coordinates of the location of interest, which may for example be the centre of the mapping electrode. The rotational direction ($r_i$) for $p_i$ relative to $p_0$ is calculated as the cross product of $p_i - p_0$ and $g_i$ after normalization as follow:

$$r_i = p_i - p_0 / \|p_i - p_0\| \times g_i / \|g_i\|$$

For a local coordinate system where the x-y plane is specified as containing $p_0$, $p_i$ and $p_{si}$, with standard basis vectors i, j and k corresponding to the x-, y- and z-axis respectively, and the origin of the local coordinates defined as $p_0$, the rotational direction $r_i$ can be written as $$r_i = r_{i,1}i + r_{i,2}j + r_{i,3}k$$

where $r_{i,1}$, $r_{i,2}$ and $r_{i,3}$ are the magnitudes of the $p_0$ along x, y and z axis. Then, CIV is calculated as $$CIV = (|\Sigma_i \text{sign}(r_{i,3})|)/(n_n(p_0))$$

where $n_n(p_0)$ is the number of available neighbouring recordings around $p_0$ to quantify the rotational activity. $n_n(p_0)$ is not necessarily to be equal to ns because not all recording sites are suitable for quantifying the rotational activity of $p_0$ depending the actual shape of the catheter.

In other embodiments, the CIV is defined in different ways. For example it can take into account not just the sign of each of the vector cross products, but also the magnitude or degree of the Granger causality between each pair of electrodes.

Another form of an organization measure which may be used to measure the degree of organization of the activation is based on the frequency components of the electrode signals. This may take the form of a frequency dominance index (FDI). The FDI may calculate the total level of organisation by analyzing all the dominant frequencies within a fibrillating ventricle, i.e. the dominant frequency of the electrode signal generated at each point in the region of the heart being measured. The FDI is defined as the proportion of fibrillatory (electrode) signals in a mapped area driven at the most prevalent dominant frequency calculated from all the signals from the mapped area. It may be expressed as a proportion value between 0 and 1. The methodology for calculating dominant frequency has been previously described in detail (see reference 1). For example, once the dominant frequency of each electrode signal is determined, the range of frequencies considered is divided into a number of possible dominant frequencies (each of which covers a narrow frequency ranges so that any dominant frequency can be allocated to one of the possible dominant frequencies). Then the number of electrode signals with a dominant frequency at each of the possible dominant frequencies is plotted as a histogram. The most prevalent dominant frequency for the mapped area is identified and the number of electrode signals with that dominant frequency is determined. Then the number of electrode signals with the most prevalent dominant frequency is determined as a fraction of the total number of electrode signals from the mapped area. That fraction will be in the range from 0 to 1 and is used as the frequency dominance index FDI.

Experiments

In order to demonstrate the effectiveness of the methods described above, experiments were carried out as described below. These use optical mapping of the activation in the heart which has a higher resolution than can be obtained with a typical catheter. The data was therefore tested using reduced resolution to demonstrate the viability of the method performed using a catheter.

Experimental Protocols

Eighteen Sprague-Dawley rats (250-300 g) were humanely killed and the hearts were explanted and Langendorff perfused for ex-vivo optical mapping studies of the transmembrane potential. VF was induced with programmed electrical stimulation (PES). To generate different levels of fibrillation organisation, eight normal hearts were acutely perfused with a gap junction uncoupler, carbenoxolone (0-50 µM) and the other ten had patchy fibrosis induced with previous cardiac surgery.

Myocardial Infarction Surgery

Ten Sprague Dawley rats were anaesthetized with 5% isoflurane in an induction chamber and intubated. The rats were ventilated using a Harvard rodent ventilator. Carprofen (5 mg/kg), Enrofloxacin (5 mg/kg), Marcaine (0.5%) was administered. The chest wall was cleaned using betadine and draped. A left sided thoracotomy was performed at the level of the 4th intercostal space with a small oblique incision. The subcutaneous layer was blunt dissected, pectoralis major and minor retracted to expose the intercostal muscles. A small incision was then made in the 4th intercostal space and the heart was exposed. The pericardium was gently stripped and the thymus was clamped in position to stabilize the heart. A small slip-knot suture was placed around the left anterior descending artery for 20 minutes using Prolene 7-0 around 3 mm below the lower border of the left atrium at a depth of 1-2 mm. Infarction was confirmed by pallor and akinesis of the anterior wall of the LV and apex. The slip knot was then released and reperfusion confirmed with visual inspection of the LV wall. The rats were extubated and recovered in a warm chamber until ambulant. The infarcts were matured for four weeks prior to the experiment.

Langendorff Perfusion

All eighteen explanted hearts were heparinized, and rapidly perfused ex-vivo on a Langendorff apparatus with Krebs-Henseleit solution (in mmol/l: NaCl 118.5, CaCl2 1.85, KCl 4.5, glucose 11.1, NaHCO3 25, MgSO4 2.5, NaH2PO4 1.4) gassed with 95% O2/5% CO2 at 37° C.±0.5° C. and pH 7.35±0.05. A 10 minute stabilization period was allowed during which the flow rate (10-15 ml/min), temperature (37° C.±0.5° C.) and perfusion pressure through the aorta was maintained between 90 and 100 mmHg. In eight of the hearts carbenoxolone (0-50 µM) was added to the perfusate and infused for at least ten minutes prior to arrhythmia provocation. VF was induced with provoked electrical stimulation using a burst pacing protocol and sustained with pinacidil (30 µM).

Programmed Electrical Stimulation

PES was carried out with silver electrodes placed at the bases of the left ventricles with a MicroPace system (Micropace EP, Santa Ana, USA). A burst pacing protocol (2 mA, cycle length 50-70 ms, 30 beat train) was used to induce VF. All hearts were pre-treated with a potassium channel opener, Pinacidil (30 µM) during the stabilization period described above to aid maintenance of VF prior to optical mapping studies.

Organizational Analysis

The processed optical mapping data were firstly analyzed to quantify the degree of global organisation with two novel independent methods, frequency dominance index and causality pairing index.

Frequency Dominance Index

The FDI calculates the total level of organisation by analyzing all the dominant frequencies within a fibrillating ventricle. As described above, the FDI is defined as the proportion of fibrillatory signal in a mapped area driven by the most prevalent dominant frequency calculated from all the signals. It is expressed as a proportion value between 0 to 1. For instance if 60% of a mapped area in fibrillation was driven by a dominant frequency of 36 Hz for instance, the FDI would be 0.6 (FIG. 10). The methodology for calculating dominant frequency has been previously described in detail (1).

Causality Pairing Index

The mathematical details of calculating CPI have been described in detail below in the section titled granger causality. The CPI calculates organisation of fibrillation from granger causality (GC) analysis. GC is a measure of temporal dependency and it has been widely used in multivariate time series study (see references 2-4). In our study the temporal dependence structure between signals from different pixels was inferred from fitting a vector auto-regression model to a multi-variate signal ($A_r$). Thereafter, the CPI was measured by quantifying the percentage of possible pixel pairings between which there is a propagational effect on a normalized scale of 0 to 1, where 0 is defined as no possible pairing having causal dependency and 1 where all possible pairings have causal dependency (this is described in more detail below with reference to FIG. 10). The more stable the propagational effects between the pixel pairings, the more organized the data. After quantifying the level of global organisation in the VF data with FDI and CPI analysis, we repeated the analysis at ¼th and ⅛th of full resolution and compared whether there was a correlation with different measures of stability and organisation ($n_r/l_r$ and $l_{ps}$) calculated from full resolution phase analysis data described below.

Phase Mapping

After quantifying the level of global organisation of VF with FDI and CPI analysis, we characterized the underlying mechanism using phase analysis and quantified rotational drivers and their characteristics. Our methods for phase analysis and tracking of rotational drivers have previously been described in detail (see references 1 and 5). Briefly, each pixel of optical fluorescence data was tagged for the minima and maxima and filtered to remove small amplitude fluctuations in the signals and fitted to a cubic spline to subtract the average of the minima and maximas splines to generate a zero mean. The real and imaginary parts of the Hilbert transform of this zero-mean signal were plotted in the phase plane and the phase angle calculated from this. A phase map of VF at each sampled time point was constructed and PS tagged using our algorithm. The edge of each wavefront was tracked in a 9×9 pixel window and maximum number of rotations [max(nrr)] calculated. A minimum 2 rotation filter was used to threshold and define a significant rotational driver and to construct phase singularity heats maps from full resolution data for validating our methodology for fibrillation analysis.

Phase Characterization of Organisation and Stability

From phase processed fibrillatory data, rotational activity was quantified by our metrics of organisation and stability ($n_r/l_r$ and $l_{ps}$) and compared with FDI, CPI and a more widely used analysis feature in fibrillation literature, Shannon entropy ($Sh_{en}$). Phase singularities with ≥2 rotations were labelled 'significant' rotations drivers ($n_r$) and the number of locations (pixels) they occupied ($l_r$) over a fibrillatory recording was tracked, thus $t_r$ divided by $l_r$ acted as a measure of stability and organisation, whereby rotational drivers with high number of rotations localizing to a small area would generate the highest values my this metric. Phase singularities with <2 rotations with labelled 'non-significant' phase singularities and the number of locations (pixels) they occupied ($l_{ps}$) acted as a measure of disorganization and instability, whereby a large number of short lived meandering phase singularities would generate the highest value by this metric. A linear regression with these objective measures ($n_r/l_r$ and $l_{ps}$) as response variables and FDI and CPI as explanatory variables was then performed. The same regression analysis was performed Shannon entropy (Shen), as the explanatory variable for the purpose of comparison. The methodology for Shen has previously been described in detail (see reference 1).

Granger Causality

Granger causality is a measure of temporal dependency and it has been widely used in multivariate time series study (see references 2 to 4). GC could be inferred by fitting a vector auto-regression model to a multi-variate signal, i.e., $$A_\tau = \arg\min \sum\nolimits_{t=p+1}^{n_t} \left\| x(t) - \sum\nolimits_\tau^p A_\tau x(t-\tau) \right\|_2 + \lambda \sum\nolimits_\tau^p \|A_\tau\|_1 \quad (1)$$

Where x(t) is the multi-variate signal, $A_\tau$ the auto-regression coefficient matrix, τ is the time lag, p the maximal time lag of the model and λ the regularization coefficient. With the $l_1$-norm based regularization term, $$\sum\nolimits_\tau^p \|A_\tau\|_1$$

solving (2) yields a more sparse and robust GC estimation $A_\tau$ (see reference 6).

In this work, the auto-regression model in (2) is fitted to optical mapping data x(t), each row of which is the signal from one pixel. The Forward Backward Lasso GC is applied to obtain $A_\tau$ (see reference 7). p=1 to reduce the computation complexity, and our results show that p=1 is enough to locate the driver. The temporal dependence structure between signals from different pixels could be inferred from $A_\tau$: the element of the i-th row and j-th column in $A_\tau$ reflects the strength of the j-th row of x(t) in predicting i-th row of x(t). In other words, if the element i-th row and j-th column in $A_\tau$ is larger than 0, the propagation direction is from j-th row to the i-th row of x(t). Based on $A_\tau$, a causality pairing index is calculated as the normalized number of non-zero elements of $A_\tau$, i.e.

$$CPI = \frac{|\{A_\tau(i,j), A_\tau(i,j) \neq 0\}|}{n_p^2} \text{ for } i,j = 1 \ldots n_p \tau = 1 \ldots p \quad (2)$$

Given the optical mapping data of $n_p$ pixels, $$n_p^2$$

is the number of all the possible paring combinations of pixels. Thus, CPI measures the percentage of the parings between which there is a propagational effects. We propose that the higher the number, the more stable propagational effects between the data, the more organized the data.

In order to localize the rotational activity, for each pixel i, the major source vector $$\vec{v}_{i,i_s}$$

is determined as the vector pointing pixel i from its major sources pixel $i_s$, i.e.

$$i_s = \arg\max A_\tau(i, i_s) \text{ for } i_s = 1 \ldots n_p \text{ and } A_\tau(i, i_s) \neq 0 \quad (3)$$

By plotting the all the major source vectors $$\vec{v}_{i,i_s},$$

a GC vector map could be derived, where the circulatory propagation directions could be identified around the rotational driver. In practical settings, the global data with high spatial resolution are not available. Thus, GC is applied for the down-sampled data of 8-by-8 points, where the spatial distance between two neighbouring points d=4 pixels. A local GC map could be derived in a similar manner, and a circular interdependence value (CIV) is calculated as $$CIV = \sum\nolimits_{n_c=1,2} \frac{\sum_i \text{sign}(\vec{v}_{i,i_s} \times \vec{v}_{i,0})}{|\{i\}|} \text{ for } \|\vec{v}_{i,0}\| < \sqrt{2}\, dn_c \quad (4)$$

Where $$\vec{v}_{i,0}$$

is the vector pointing from the centre of the down-sampled area to pixel i, and $n_c$ is the number of the 'circles' around the centre to be counted. The shape of the 'circle' will depend on the positioning of the electrodes on the probe. The first 'circle' is made up of the electrodes closest to the centre point, for example electrodes 6, 7, 10 and 11 in FIG. 3, and the second 'circle' is made up of the next closest electrodes, for example the remaining electrodes in FIG. 3.

With $$\text{sign}(\vec{v}_{i,i_s} \times \vec{v}_{i,0})$$

as the direction of the cross product of the major source vectors $$\hat{v}_{i,i_s}$$

and $$\hat{v}_{i,0},$$

CIV measures the percentage of the major source vectors $$\hat{v}_{i,i_s},$$

pointing to the same rotational direction, i.e. counter-clockwise or clockwise. CIV=1 indicates that all the major source vectors $$\hat{v}_{i,i_s}$$

surrounding the centre of the down-sampled area are of the same rotational direction, and subsequently, the centre is highly likely to be the driving area (as described further below with reference to FIG. 10).

Statistical Analysis

All statistical analysis was performed using a statistics software package (Graphpad, Prism version 5, Graphpad Software, California, USA). Student t tests were used to compare means between two groups. For each optical mapping recording, objective measures derived from optical mapping analysis were calculated, together with FDI, CPI and Shen. Given all the measures of 16 recordings, linear regression models were fitted to FDI, CPI or $Sh_{en}$ as explanatory variables and $l_{ps}$ or $n_r/l_r$ as response variables, and F-test was applied for the linear models. P<0.05 was regarded as significant. Results are expressed as mean±SEM.

Results

The spectrum of fibrillation organisation can be characterized by the FDI and CPI.

By introducing structural heterogeneity with fibrosis and conductional velocity heterogeneity with carbenoxolone in the ventricle, a spectrum of fibrillatory conduction was generated that showed a continuous spread in organization between fibrillation driven by organized rotational drivers and fibrillation driven by chaotic activity. CPI and FDI as tools for measuring organization of fibrillation, when compared to a measure of disorganization and instability ($l_{ps}$) generated from high resolution phase analysis, showed that there was a negative correlations between the CPI and $l_{ps}$ [full resolution: F(1,16)=11.0,p=0.005, ¼th resolution: F(1, 16)=11.7, p=0.005 and ⅛th resolution F(1,16)=9.9,p=0.004] and FDI and $l_{ps}$ [full resolution: F(1,16)=10.4,p=0.006, ¼th resolution: F(1,16)=10.42, p=0.004 and ⅛th resolution F(1, 16)=9.8,p=0.004] at decreasing resolution as shown in FIG. 4. In other words, disorganized fibrillation with a high number of meandering non-significant phase singularities had low FDI and CPI values.

Conversely, we found a positive correlation between FDI and CPI, and a measure of organization and stability ($n_r/l_r$) generated from high resolution phase analysis as shown in FIG. 9. Thus, high FDI and CPI values correlate with a VF mechanism where stable non-meandering rotational drivers with a high number of rotations are present. For both FDI and CPI, downsampling the data to ¼th and ⅛th of full resolution showed that the statistical significance of the linear correlation was maintained as shown in FIG. 9. Shannon entropy values showed no statistically significant correlation with $l_{ps}$ (full resolution: F(1,16)=0.30,p=0.39, ¼th resolution: F(1,16)=0.306, p=0.39 and ⅛th resolution F(1,16)=0.30,p=0.40) or $n_r/l_r$ as shown in FIG. 4 and FIG. 9.

FIG. 5 shows three hearts selected along the organizational spectrum and characterized by phase analysis and dominant frequency analysis. Hearts with the highest FDI had significant rotational drivers that demonstrated more rotations and had much fewer short lived phase singularities in comparison to hearts with a lower FDI. The phase analysis heat map showed well localized discrete areas harbouring the organized rotational driver in hearts with a high FDI, whereas hearts with a low to intermediate FDI values did not show such areas.

Granger Causality Mapping to Localise Driver Regions

Three sample organized hearts with the highest FDI and CPI as described above underwent GC vector mapping, to identify regions harbouring rotational drivers. To test the accuracy of GC vector mapping using a typical probe, the data was downsampled to ¼th and ⅛th of full resolution. Neighbouring regions with strong causal relationships and interdependence of signals were seen over the duration of the VF recording. In certain areas the GC vectors organized in a signature continuous circular interdependence of signals, and these areas correlated with sites of localization of stable rotational drivers on phase analysis. This pattern was not seen in regions not localizing rotational drivers, as shown in FIG. 6. Optical fluorescence data showed organized early to late activation within this region in a circumferential manner.

Figure 7:
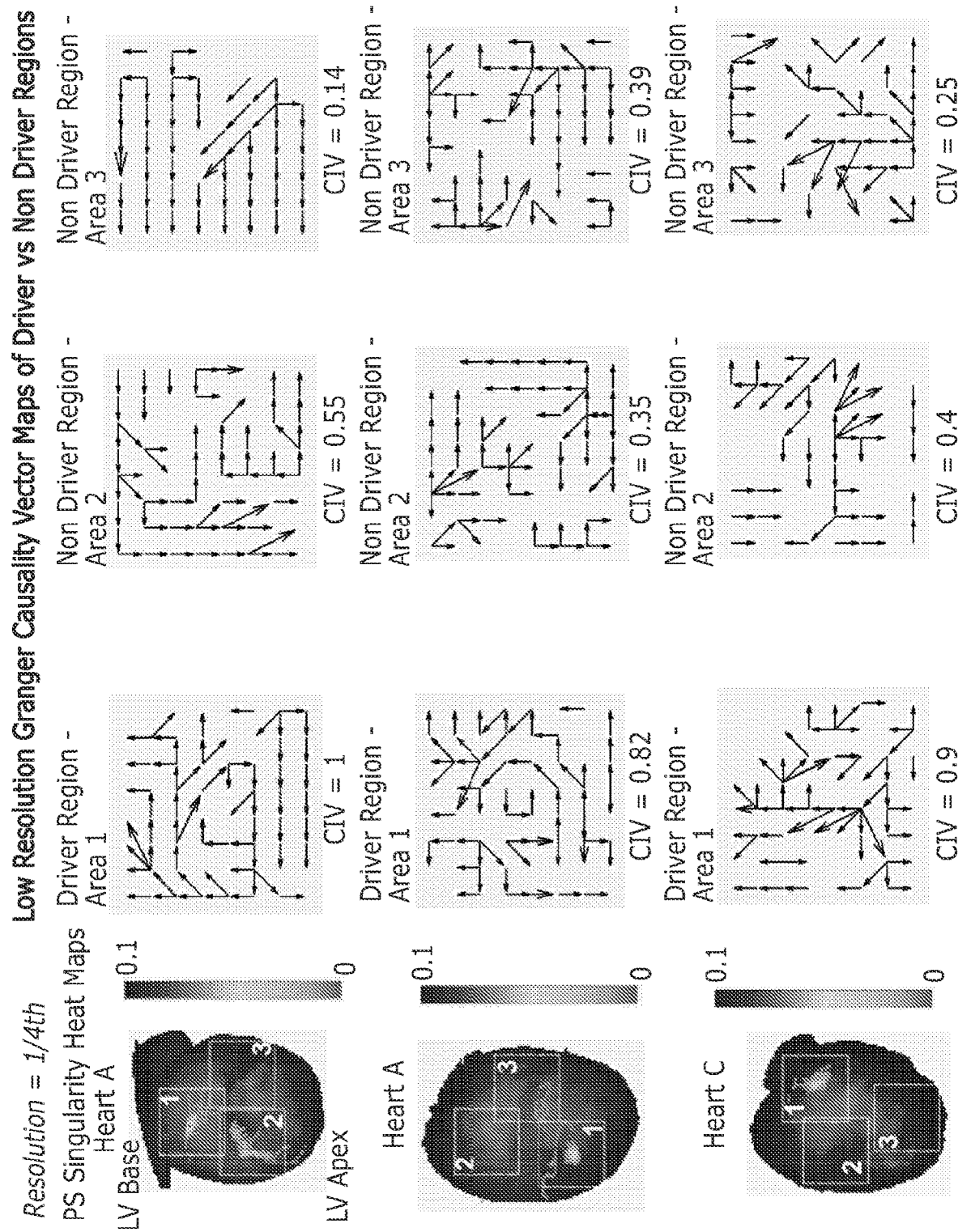
FIG. 7 shows phase singularity heat maps constructed from LV anterior wall epicardial optical mapping data of three organized fibrillation data sets; Heart A, B and C (left) and the correlating limited coverage Granger causality maps.
Figure 8:
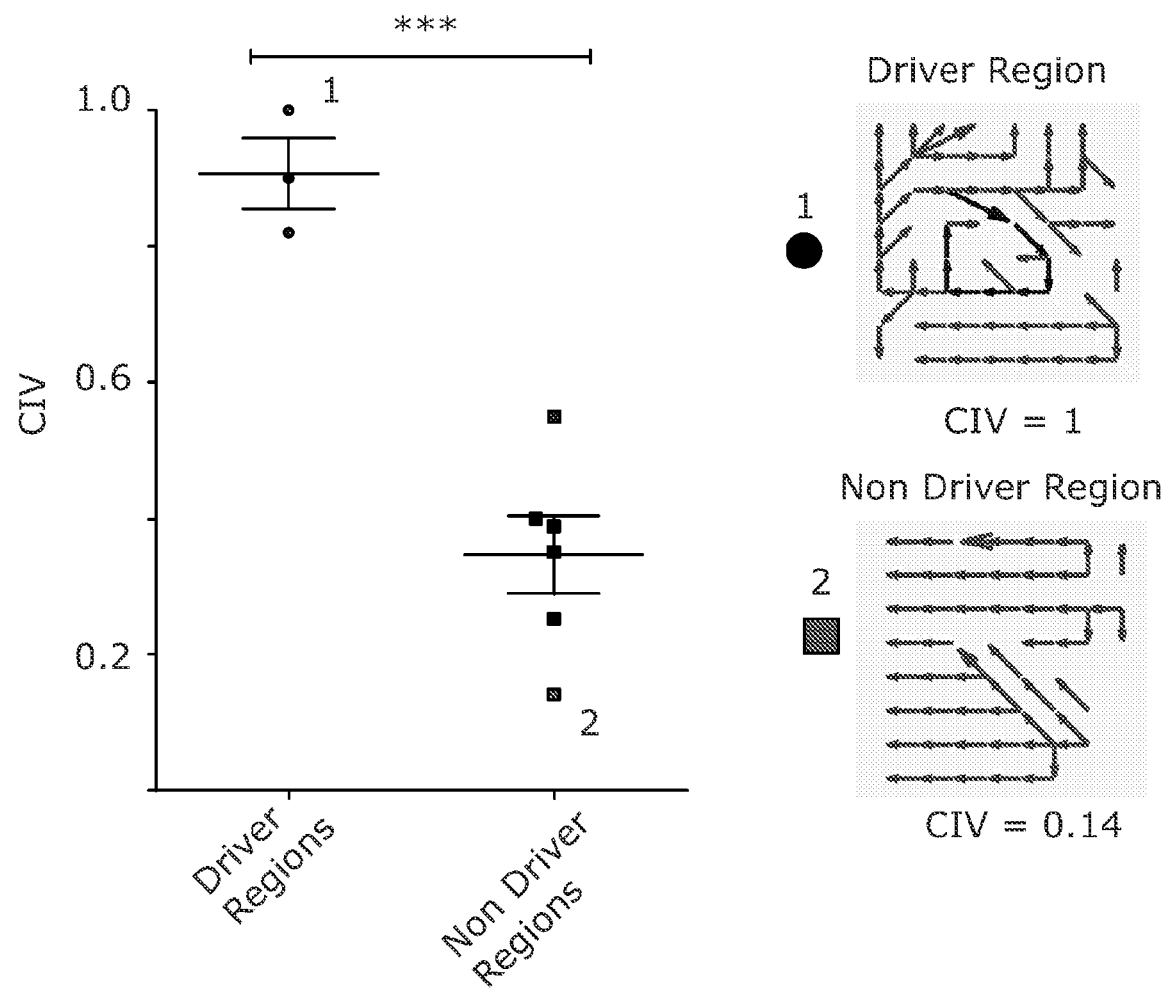
FIG. 8 is a graph showing circulatory interdependence values of driver regions vs non-driver regions with sample GC maps (right)

FIG. 7 shows that in all three organized hearts GC vector mapping at low resolution was able to identify the driver region at ¼th the resolution of phase analysis. The circular interdependence of signals was seen in areas harbouring stable rotational drivers in all organized hearts with high CIV values (CIV=1.0, 0.82, 0.9). However, this relationship was not seen in non-driver regions where GC vectors had a random or non-circular distribution, such as heart B area 2 (CIV=0.35) or heart C area 2 (CIV=0.4) showed lower values. Areas with meandering rotational drivers with less stability showed intermediate organization and an intermediate CIV value such as heart A area 2 (CIV=55). At ⅛th of the full resolution rotational driver regions could no longer be localized accurately with GC mapping, as the grid occupied more than half of the mapped ventricle at this resolution (64×64 pixels). FIG. 8 shows that in the regions harbouring stable rotational drivers, the CIV was 2.6 fold higher than regions without rotational driver (0.91±0.05 vs 0.35±0.06, p=0.0002, n=3).

Referring to FIG. 10, a method of locating rotary drivers according to an embodiment of the invention comprises creating a Granger Causality vector map of an area of the heart, determining a causality pairing index for the area, determining a frequency dominance index (FDI) for the area, and then determining a circulatory interdependence value (CIV) for regions within the total mapped area where there is a high degree of organisation as indicated by the values of FDI and/or CIV. The values of the CIV are used to locate rotational drivers.

FIG. 10A shows an example simplified 3×3 pixel grid with corresponding electrode signals below showing granger causality vectors between signals with the strongest temporal dependence. FIG. 10B shows who the causality pairing index for data in (A) is derived showing 4 pixel pairs with causal temporal dependence of propagation, with shading corresponding to the GC vectors. CPI is defined as the pixel pairs with causal dependence divided by all possible pixel pairings in a data set.

FIG. 10D is an example dominant frequency (DF) map showing all the DFs driving fibrillation in the LV anterior wall. The histogram below plots these frequencies. The frequency dominance index (FDI) is calculated as described above by taking the integral (number of electrode positions) of the highest amplitude dominant frequency in the global spectrum (black arrow) and dividing it by the integral (total number of electrode positions) of all frequencies in the mapped area to generate a proportion value between 0 to 1.

Either or both of CPI and FDI can be used to identify regions of high organisation, which can then be analysed to locate rotary drivers.

FIG. 10C shows the derivation of Circulatory Interdependence Value (CIV) for 3 examples. For each GC vector (black arrow), a cross product virtual 3D vector is generated (grey arrow) relative to vector to the centre (dashed black line). The resulting virtual 3D vector is binarised as pointing up or down as shown in example for vector a and vector b. CIV is calculated on a scale of 0 to 1 by subtracting the number of vectors pointing down from number of vectors pointing up divided by total number of vectors. The three examples above demonstrate expected values for; example 1—stable rotational driver, example 2—random propagation, example 3—linearly propagating wavefront. With this method areas of rotational activity will give a CIV value closer to 1.

Discussion

In the experiment described above it has been demonstrated that the organization within a fibrillation data set can be quantified using FDI and the CPI. Both FDI and CPI were effective as low resolution tools for measuring organization. It was also shown that only organized data sets had areas harbouring stable rotational drivers. Thereafter, GC mapping was utilized to accurately identify driver regions with non-panoramic, low resolution, limited coverage, sequential mapping. Finally, it was demonstrated that a single measure, the CIV, can differentiate areas with driver regions from non-driver regions.

Clinical Implications

In this study we have established GC analysis as a potential tool in mapping fibrillation drivers independent of phase analysis. Detailed mapping in AF can be time consuming, technically challenging and in complex fibrillation may not identify any rotational drivers. In VF, after induction, there is only a limited period for mapping of this unstable rhythm before the patient needs cardioversion to sinus rhythm (see reference 8). Both FDI and CPI can be applied to electrograms from either ventricular or atrial chambers, and potentially be used for quick global low resolution data sampling in fibrillation to identify patient where the ventricle or atria demonstrate high levels of fibrillation organization and are more likely have regions that localise rotational drivers. Thereafter, only these patient could undergo more detailed mapping within the current clinical constraints of low resolution, sequential mapping and low coverage data acquisition to accurately identify driver regions suitable for ablation. There is potential for application of the GC methodology to non-invasive tools such as the multielectrode ECGI body surface mapping system (see reference 9).

REFERENCES

1. Handa B S, Roney C H, Houston C, Qureshi N A, Li X, Pitcher D S, et al. Analytical approaches for myocardial fibrillation signals. Comput Biol Med [Internet]. 2018; Available from: http://www.sciencedirect.com/science/article/pii/S0010482518301999
2. Granger C W J. Investigating Causal Relations by Econometric Models and Cross-spectral Methods. Econometrica [Internet]. [Wiley, Econometric Society]; 1969; 37(3):424-38. Available from: http://www.jstor.org/stable/1912791
3. Granger C W J. Testing for causality: A personal viewpoint. J Econ Dyn Control [Internet]. 1980; 2:329-52. Available from: http://www.sciencedirect.com/science/article/pii/016518898090069X
4. Silvapulle P, Choi J-S. Testing for linear and nonlinear granger causality in the stock price-volume relation: Korean evidence. Q Rev Econ Financ [Internet]. 1999; 39(1):59-76. Available from: http://www.sciencedirect.com/science/article/pii/S1062976999800040
5. Roney C H, Cantwell C D, Qureshi N A, Chowdhury R A, Dupont E, Lim P B, et al. Rotor Tracking Using Phase of Electrograms Recorded During Atrial Fibrillation. Ann Biomed Eng. United States; 2017 April; 45(4):910-23.
6. Arnold A, Liu Y, Abe N. Temporal causal modeling with graphical granger methods. Proc 13th ACM SIGKDD Int Conf Knowl Discov data Min—KDD '07 [Internet]. 2007; 66. Available from: http://portal.acm.org/citation.cfm?doid=1281192.1281203
7. Cheng D, Bahadori M T, Liu Y. FBLG: A Simple and Effective Approach for Temporal Dependence Discovery from Time Series Data. 20th ACM SIGKDD Int Conf Knowl Discov Data Min. 2014; 382-91.
8. Haïssaguerre M, Hocini M, Cheniti G, Duchateau J, Sacher F, Puyo S, et al. Localized Structural Alterations Underlying a Subset of Unexplained Sudden Cardiac Death. Circ Arrhythmia Electrophysiol [Internet]. 2018; 11(7):e006120. Available from: http://circep.ahajournals.org/lookup/doi/10.1161/CIRCEP.117.006120
9. J Shah A, Hocini M, Pascale P, Roten L, Komatsu Y, Daly M, et al. Body Surface Electrocardiographic Mapping for Non-invasive Identification of Arrhythmic Sources. Arrhythmia Electrophysiol Rev. England; 2013 April; 2(1):16-22.

The invention claimed is:

1. An apparatus for monitoring activation in a heart during movement of a series of activation wavefronts across the heart, the apparatus comprising a probe, a plurality of electrodes supported at respective electrode positions on the probe and each configured to contact a respective detection position on the heart, wherein each of the electrodes is configured to detect electrical potential at the respective detection position during said movement of said series of activation wavefronts across the heart and to produce a respective electrode signal, and a processor configured to analyse the electrode signals to:
  define a threshold value of Granger causality;
  identify pairs of the electrode signals between which there is a Granger causality over the defined threshold value;
  define a Granger causality vector between the two electrode positions of each of the pairs of electrodes;
  define a plurality of regions of the heart;

analyse the Granger causality vectors in the plurality of regions of the heart to determine an organization measure for each of the regions, and to select one of the plurality of regions based on the organization measure;

identify a potential driver location within said one of the plurality of regions; and analyse a direction of a plurality of the Granger causality vectors around the potential driver position thereby to generate an indicator of a presence of a driver at the potential driver location;

wherein the organization measure includes a measure of the number of said pairs of electrodes within said one of the regions that have a Granger causality over the defined threshold; and wherein the processor is arranged to analyse the direction of a plurality of the Granger causality vectors around the potential driver location by defining a relative position vector for each of the pairs of electrodes, related to a relative position of at least one of the pair of electrodes and the potential driver position, and, for each pair of electrodes, forming a vector cross product between the Granger causality vector and the relative position vector.

2. The apparatus according to claim 1 wherein the processor is arranged to identify the pairs of the electrodes using a multi-variate auto-regression model.

3. The apparatus according to claim 1 wherein the processor is arranged to analyse the direction of a plurality of the Granger causality vectors around the potential driver location by: defining a relative position vector for each of the pairs of electrodes, related to a relative position of at least one of the pair of electrodes and the potential driver position, and, for each pair of electrodes, forming a vector cross product between the Granger causality vector and the relative position vector.

4. The apparatus according to claim 3 wherein the processor is arranged to sum the vector cross products to generate the indicator.

5. The apparatus according to claim 1 wherein the organization measure includes a measure of at least one dominant frequency in the electrode signals.

* * * * *